(12) United States Patent
Makelä et al.

(10) Patent No.: US 7,719,404 B2
(45) Date of Patent: May 18, 2010

(54) TEMPERATURE DETECTOR/INDICATOR

(75) Inventors: Tapio Makelä, Helsinki (FI); Harri Kosonen, Espoo (FI)

(73) Assignee: Avantone Oy, Tampere (FI)

( * ) Notice: Subject to any disclaimer, the term of this patent is extended or adjusted under 35 U.S.C. 154(b) by 867 days.

(21) Appl. No.: 10/545,816

(22) PCT Filed: Feb. 26, 2004

(86) PCT No.: PCT/FI2004/000103
§ 371 (c)(1), (2), (4) Date: Oct. 18, 2005

(87) PCT Pub. No.: WO2004/077002
PCT Pub. Date: Sep. 10, 2004

(65) Prior Publication Data
US 2006/0203882 A1    Sep. 14, 2006

(30) Foreign Application Priority Data
Feb. 27, 2003    (FI) .................... 20030299

(51) Int. Cl.
*H01C 10/50* (2006.01)
(52) U.S. Cl. .............. 338/200; 338/34; 428/411.1
(58) Field of Classification Search ........... 338/200
See application file for complete search history.

(56) References Cited

U.S. PATENT DOCUMENTS

| | | | |
|---|---|---|---|
| 3,782,195 A * | 1/1974 | Meek et al. ............ 374/161 |
| 3,951,757 A | 4/1976 | Yoshino et al. |
| 4,675,161 A * | 6/1987 | Hashimoto et al. ........... 422/56 |
| 5,185,100 A * | 2/1993 | Han et al. .................. 252/500 |
| 5,597,238 A | 1/1997 | Colley et al. |
| 6,706,218 B2 * | 3/2004 | Lucht et al. .............. 252/408.1 |
| 6,828,062 B2 * | 12/2004 | Lu et al. .................... 429/213 |
| 2004/0099211 A1 * | 5/2004 | Makela et al. .............. 118/46 |
| 2004/0238901 A1 * | 12/2004 | Balkenende et al. ........ 257/406 |

FOREIGN PATENT DOCUMENTS

| | | |
|---|---|---|
| EP | 0 276 335 A1 | 8/1988 |
| EP | 0 484 578 A1 | 5/1992 |
| EP | 0 930 487 A1 | 7/1999 |
| GB | 1 473 125 | 8/1974 |
| JP | 63-182522 | 7/1988 |
| JP | 06-501770 A | 2/1994 |
| JP | 07-286914 | 10/1995 |
| RU | 2 131 117 C1 | 5/1999 |

(Continued)

OTHER PUBLICATIONS

Makela et al; "Lithographic Patterning of Conductive Polyaniline"; Synthetic Metals; vol. 101; pp. 705-706; 1999; XP-001058126.

(Continued)

*Primary Examiner*—Elvin G Enad
*Assistant Examiner*—Joselito Baisa
(74) *Attorney, Agent, or Firm*—Oliff & Berridge, PLC

(57) ABSTRACT

The invention relates to an electrical and/or optical temperature detector/indicator based on conductive polymers, said detector/indicator being suitably used in such packages for products, the temperature changes of which need to be monitored.

19 Claims, 4 Drawing Sheets

FOREIGN PATENT DOCUMENTS

| | | |
|---|---|---|
| SU | 512 392 | 4/1976 |
| SU | 631 061 | 10/1978 |
| SU | 717 201 | 2/1980 |
| WO | WO 92/09870 | 6/1992 |
| WO | WO 99/31501 | 6/1999 |
| WO | WO 99/36755 | 7/1999 |
| WO | WO 99/56098 | 11/1999 |

OTHER PUBLICATIONS

Translation of Japanese Office Action mailed Jan. 5, 2010 in Japanese Appln. No. 2006-502077.

* cited by examiner

TEMPERATURE DETECTOR/INDICATOR

TECHNICAL FIELD

The present invention relates to an electrical and/or optical temperature detector/indicator on the basis of conductive polymers, said detector/indicator being suitably used in packages for products, the temperature changes of which need to be monitored.

PRIOR ART

At present, various temperature-sensitive indicators based on colour change, used for monitoring the storage of highly perishable products such as food products, drugs, biological materials, chemicals, coating compositions, adhesives, cosmetics, food additives, materials for photography, and vaccines, are known. The life span of food products is often rather short, and the shelf life thereof is clearly dependent on the uninterrupted cold storage chain. Especially meat and milk products keep best at low temperatures where the proliferation of harmful bacteria is slower. However, if the temperature of the product is allowed to increase even momentarily, the bacterial growth will accelerate, and notwithstanding the recooling of the food product, the shelf life thereof will be considerably shortened. The process of shipping of products such as food products from production plants to retail stores, and finally to the customers includes several steps wherein the cold chain may be interrupted. It is important for consumers, retail trade wholesalers, and producers of food products to readily notice the interruption of the cold chain with for instance electrical or optical means.

The temperature detectors used at present mainly indicate the maximum, or minimum storage temperature of the product, and they are normally attached as self-adhesive labels on the food product packages. Said temperature detectors must be activated by suitable procedures before use. WO 9931501 discloses a method and means for activating an indicator comprising a pair of ampoules filled with liquids, said ampoules being separated by an element that may be broken readily. A compressive force is applied to the breakable element, thus breaking it, whereupon the liquids are mixed and activation is completed.

Based on what is said above, there is an evident need for such a temperature detector/indicator that may directly be incorporated into the particular packing material of the product, thus avoiding the steps of attachment and activation of self-adhesive labels. Particularly in food industry, there is a need for improved control of the cold storage chain, and for a low-cost temperature detector/indicator for monitoring and controlling said cold chain.

GENERAL DESCRIPTION OF THE INVENTION

The object of the invention is to provide an electrical and/or optical temperature detector/indicator allowing the monitoring of the temperature of a product, and electrical and/or optical detection of the exceeded temperature limit.

Another object of the present invention is to provide an electrical and/or optical temperature detector/indicator based on a conductive polymer and/or polyelectrolyte.

Still another object of the present invention is a method for producing an electrical and/or optical temperature detector/indicator.

Further, an object of the present invention is the use of an electrical and/or optical temperature detector/indicator for monitoring temperatures of product packages and for detecting exceeded temperature limits.

The electrical and/or optical temperature detector/indicator according to the invention comprises a conductive polymer layer incorporated into, or onto a substrate material, and at least one dedoping or doping layer. Said layers are preferably separated from each other by a thin protective layer preventing the dedoping or doping agent from diffusing into the conductive polymer layer at correct storage temperatures.

Characteristic features of the electrical and/or optical temperature detector/indicator according to the invention, the method for the production thereof, and the use thereof are presented in the claims.

DETAILED DESCRIPTION OF THE INVENTION

It has now been found that the problems associated with solutions according to prior art may be avoided, or substantially reduced by the electrical and/or optical temperature detector/indicator according to the invention. On one hand, said temperature detector/indicator is based on the redox reaction of said conductive polymers, and on the other hand, on transition temperatures of organic or inorganic polymeric or low molecular weight dedoping or doping compounds and/or protective layer materials. A doping compound means here a compound having a pH value not higher than 6, and/or a compound that increases the conductivity of a non-doped conductive polymer more than a 10-fold, whereas a dedoping compound means a compound having a pH value not less than 8, and/or a compound that decreases the conductivity of a doped conductive polymer more than 10-fold.

In a preferable embodiment a temperature-sensitive protective layer material is used, whereby the protective layer melts by a temperature increase, thus allowing the doping/dedoping compound to be partly or totally dissolved in said protective layer material, and/or the doping/dedoping compound may otherwise react with the conductive polymer.

Temperature detection/indication takes place electrically by monitoring electrical conductivity changes of the conductive polymer and/or optically by means of following a colour change. One of these phenomena is, or both are, an irreversible change in the detector/indicator structure.

The mobility of solid state dedoping compounds is substantially lower than that of liquid or gaseous dedoping compounds, and accordingly, also dedoping of the conductive polymers is essentially slower. Transition temperatures of chemical dedoping compounds include melting temperature and glass transition temperature, above which chemical reactions with conductive polymers are accelerated, and electrical conductivity is rapidly lowered. The doping compound and the protective layer material may have identical transition states with the dedoping compound, that is melting and glass transition.

The electrical temperature detector/indicator according to the invention comprises a conductive polymer layer incorporated into, or onto a substrate material, said conductive polymer layer comprising a conductive polymer in conductive form and at least one dedoping layer, or a conductive polymer in non-conducting form and at least one doping layer. The thickness of the conductive polymer layer is from 0 to 2 mm, preferably from 0.001 to 1 mm, and particularly preferably from 0.001 to 0.1 mm.

Said layers are separated from each other by one or more thin protective layer. In some cases it is preferable to substitute a doping compound for the dedoping compound, and accordingly, a non-conducting form of the conductive polymer is used. The conductive polymer layer and dedoping/ doping layer may be superimposed, or they may lie as parallel stripes, dots or geometric patterns, separated by a protective layer. The thickness of the protective layer is from 0 to 2 mm, preferably from 0.001 to 1.0 mm, and particularly preferably from 0.001 to 0.1 mm.

In the present invention, doping and dedoping of a conductive polymer is combined to a change caused by transition temperatures of organic/inorganic compounds for controlling the cold chain of temperature sensitive products. In the electrical and/or optical temperature detector/indicator according to the invention, the conductive polymer and the dedoping/doping compound are in separate layers.

Suitable dedoping compounds are basic compounds having a pH of $\geq 8$, and/or agents decreasing the conductivity of a doped conductive polymer by a factor of at least 10 ($\Delta\sigma=10$, $\Delta\sigma=\sigma_{initial}/\sigma_{final}$), preferably $\Delta\sigma=10^3$, and more preferably $\Delta\sigma=$ more than $10^5$. Suitable bases include organic and inorganic bases such as aromatic and aliphatic amines, pyridine, urea derivatives, alkalimetal, alkaline earth metal, and metal hydroxides and carbonates, preferably octadecyl amine, hexadecyl amine, hexamethyl tetraamine, and derivatives thereof.

Suitable doping compounds are substances having a pH of $\leq 6$, and/or agents that increase the conductivity of a non-doped conductive polymer by a factor of at least 10 ($\Delta\sigma=10$, $\Delta\sigma=\sigma_{initial}/\sigma_{final}$), preferably $\Delta\sigma=10^3$, and more preferably $\Delta\sigma=$ more than $10^5$. Examples of doping agents include organic and inorganic acids such as sulphonic acid, sulphuric acid, phosphoric acid, boric acid, nitric acid, nitrous acid, HCl, HI, HF, HBr, HClO$_4$, HClO$_3$, H$_2$CO$_3$, and some carboxylic acids such as acetic acid, formic acid, benzoic acid, succinic acid, maleic acid, tartaric acid, citric acid, fumaric acid, malic acid, and derivatives thereof. Two or more of said dedoping/doping layers may also be present. Processability and stability of the dedoping and doping compounds may be improved by adding a suitable polymer, i.e. a support not altering transition temperatures, dedoping or doping rates or not otherwise influencing the operation of the detector. Suitable supporting polymers include polymeric materials such as polypropylene, polyethylene, polystyrene, polymethylmethacrylate, polyvinylphenol, polystyrene-polybutadiene latexes, and polystyrene-polyethylene-butylene block copolymers.

The conductive polymer and the dedoping/doping compound are preferably separated from each other by a thin protective layer. Said protective layer comprises a material not significantly influencing the conductivity of the doped or undoped conductive polymer. Examples of suitable protective layer materials include alkyl alcohols and phenols, 1-dodecylalcohol, 1-tetradecylalcohol and 1-decylalcohol being preferable. Said protective layer may comprise a single material, or a mixture of several materials, thus allowing the adjustment of the transition temperature. The protective layer materials may be further selected from materials not reacting with the dedoping or doping compound, and/or the reaction may not influence the operation of the detector/indicator. The stability and sensitivity of the detector/indicator may be improved with the temperature-sensitive protective layer, thus avoiding "crawling effect", that is, slow alteration of resistance during storage at low temperatures.

Above the transition temperature and at a precisely defined temperature, the dedoping/doping agent may penetrate the protective layer to reach the conductive polymer layer, and accordingly, cause a change in the electrical conductivity. The change in the electrical conductivity may for instance be measured with galvanic circuitry as a resistance measurement, and/or as a change in capacitance, and/or in a wireless manner. Suitable temperature range for the operation of the detector/indicator of the invention is between $-50°$ C. and $+200°$ C.

Useful conductive polymers include for instance polyelectrolytes, polythiophenes, polypyrroles, polyaniline, and the derivatives thereof.). A preferable conductive polymer is polyaniline (PANI), which theoretically contains in the polymer chain equal amounts of imines and amines in emeraldine base form, one of the forms being, however, actually often present in excess. The general structure of PANI is presented by the formula I below.

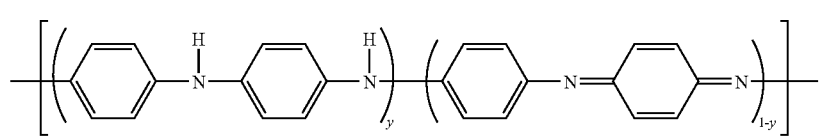

The emeraldine base is structurally not conjugated, and thus it is not electrically conducting, the conductivity thereof being about $10^{-12}$ S/cm. When a conductive polymer is contacted with a strong acid, a proton is transferred from the acid to the polymer, whereupon the polymer forms a conjugated structure allowing the electrons to migrate along the polymer chain, thus providing a conductivity of even more than $10^2$ S/cm. Protonation may thus alter the conductivity by a factor of about $10^{14}$. Alterations of the conductivity of the conductive polymer may be utilized in the temperature detectors/indicators according to the invention. Imines present in the polymer chain are weak bases in comparison to low molecular basic compounds, and for this reason, a strong acid reacts more readily with such molecules rather than with polymers. When a conductive polyaniline is added with amines or similar basic compounds having low molecular weight, a strong acid is cleaved from the polyaniline, thus lowering the conductivity of the polymer.

The invention is now illustrated by means of the appended Figures without wishing to limit the scope thereof.

LIST OF FIGURES

Figure 6:
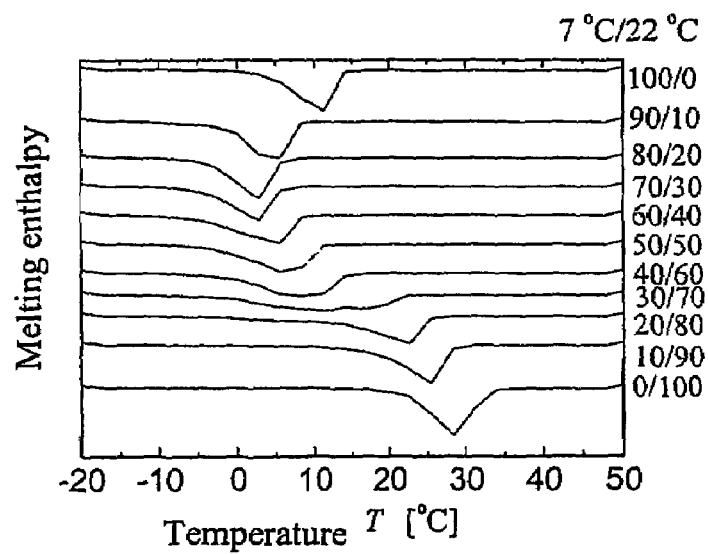

In FIG. 6, the effect of mixing on the melting point was studied by DSC method.

Figure 7:
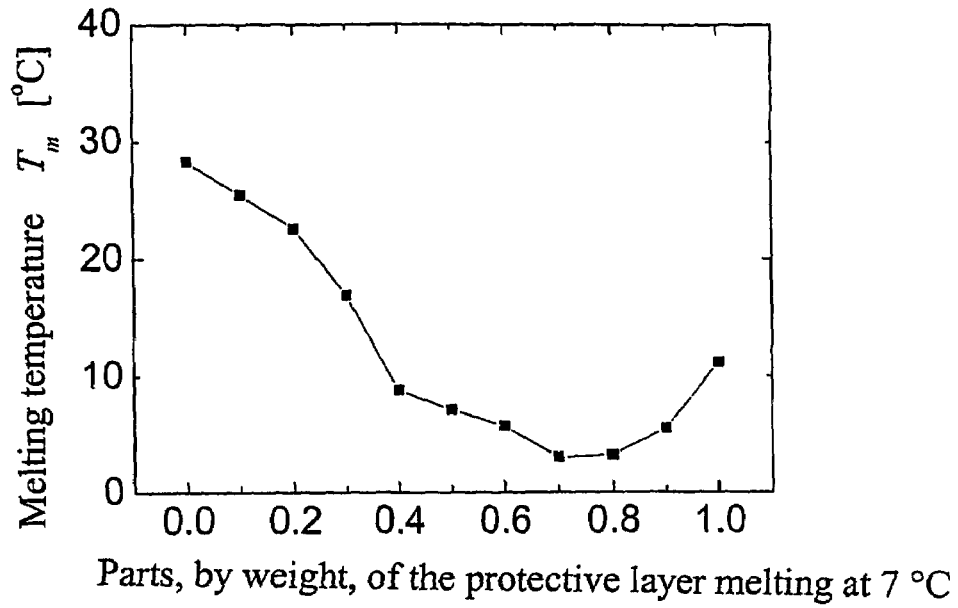

FIG. 7 shows melting points vs. parts by weight of a protective layer material melting at 7° C.

Figure 8:
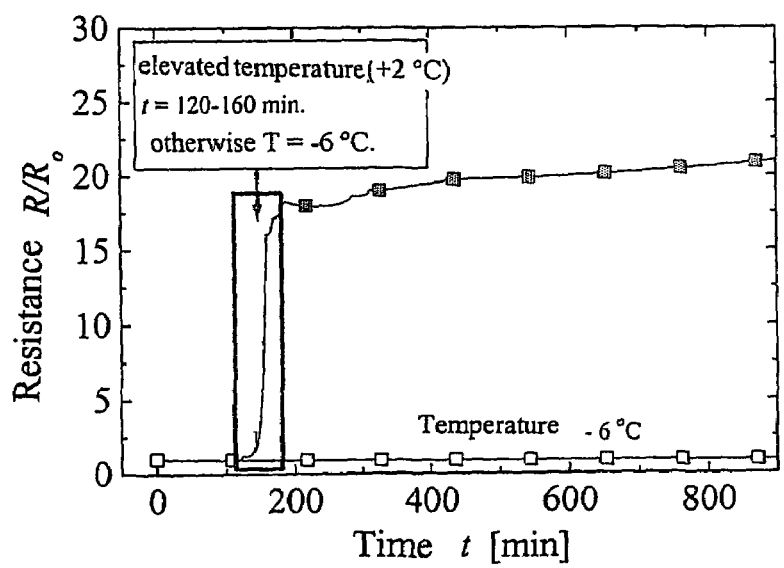

FIG. 8 shows the increase of the relative resistance of an indicator for a deep-frozen product vs. time at −6° C., and in case the product/deep-frozen product is thawed for a moment.

Figure 1:
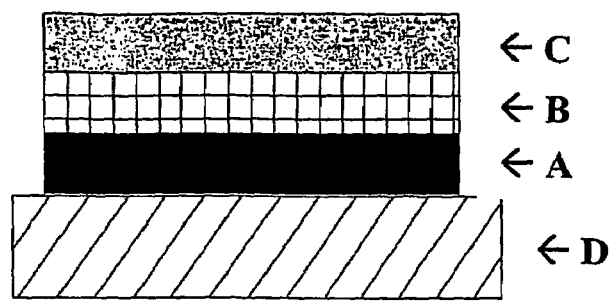
FIG. 1 shows two alternative principal structures of the electrical temperature detector/indicator of the invention.
Figure 1:
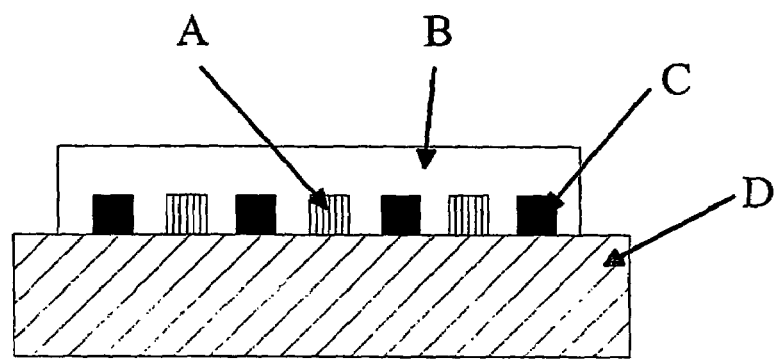

In FIG. 1, layer A represents a conductive polymer layer, layer B means a protective layer, and layer C means a dedoping/doping layer before reaching the transition temperature. D represents the substrate having the temperature detector/indicator incorporated therein/thereon. In FIG. 1*a*, the layers are superimposed, and in FIG. 1*b*, the conductive polymer layer A and the dedoping/doping layer C are in the form of parallel stripes separated by the protective layer B.

Figure 2:
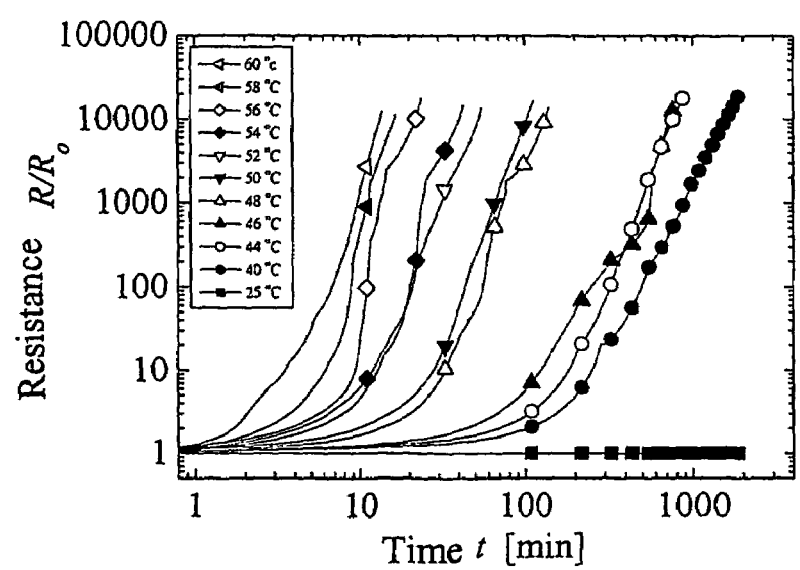
FIG. 2 shows the change of the resistance for the structure of FIG. 1.

FIG. 2 shows the change of resistance vs. time (1-1000 min) at different temperatures for a electrical temperature detector/indicator structure of FIG. 1. Octadecyl amine is used as the dedoping agent, and polymethylmethacrylate is used as the protective layer. Such a structure is very suitable for example for monitoring the heating of food products for microwave ovens.

Figure 3:
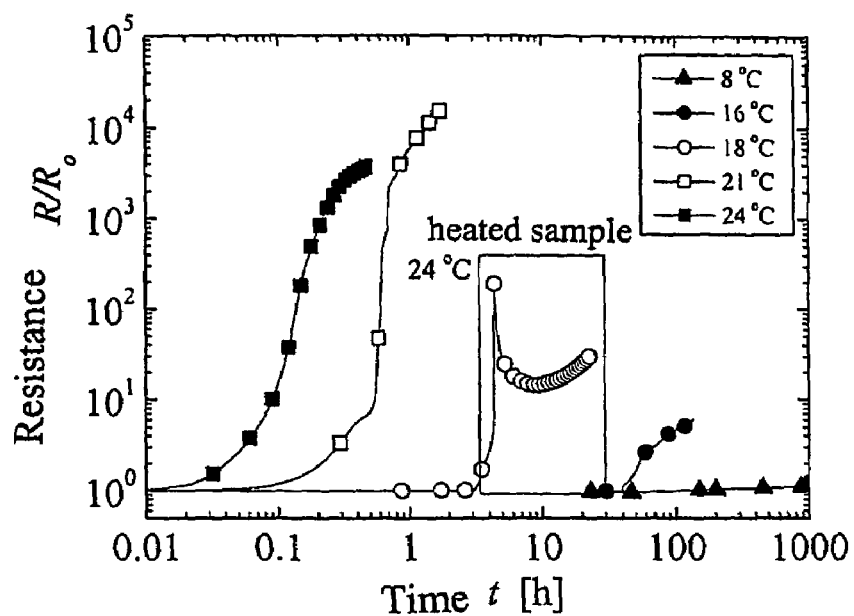
FIG. 3 shows the change of the resistance for another electrical temperature detector/indicator according to the invention.

FIG. 3 shows resistance measurements for a temperature-sensitive protective layer (1-dodecyl alcohol). Changes in the conductivity take place near the storage temperature of the product. Melting point of the protective layer was 22° C. The resistance hardly "crawls" with time although the temperature is just below the melting temperature of the protective layer.

Figure 4:
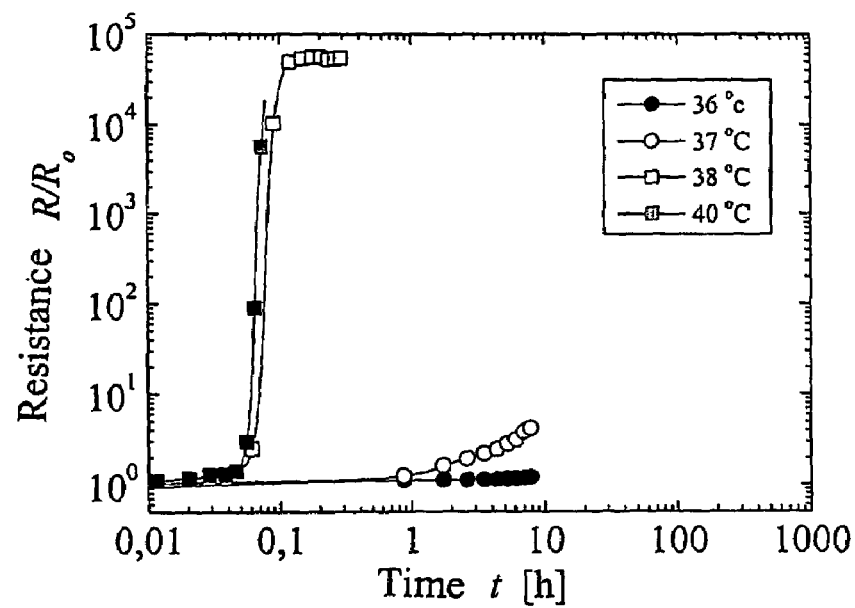
FIG. 4 shows the change of the resistance, when a protective layer having a higher melting point was used.

FIG. 4 shows the change of resistance, when a protective layer having a higher melting point (1-tetradecyl alcohol) was used. In this test series, a protective layer melting at $T_m=38°$ C. was tested, and the Figure shows the change of resistances of these samples at different temperatures vs. time.

Figure 5:
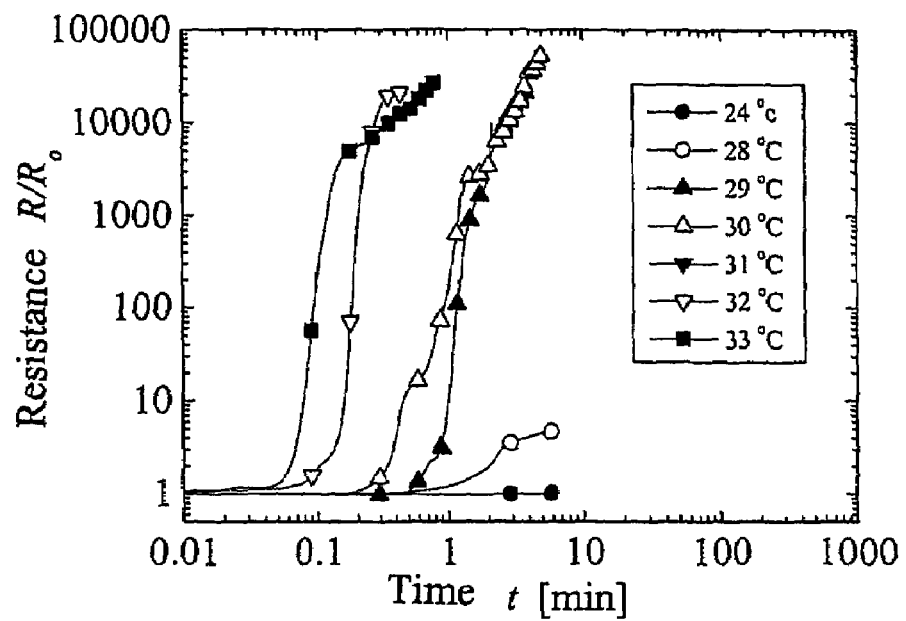
FIG. 5 shows the change of the resistance, when protective layer materials having different melting points were mixed with each other.

FIG. 5 shows the change of the resistances when protective layer materials having different melting points were mixed with each other, the effect of said mixing on the melting temperature was studied indirectly with conductivity measurements. The change of the resistance is presented at different temperatures vs. time, when two protective layer materials (1-tetradecyl alcohol and 1-dodecyl alcohol) were mixed with each other, the mixing ratio being (38° C.:22° C.=80:20). From FIGS. 3-5, it may be seen that the melting temperature may be adjusted by mixing protective layer materials.

In FIG. 6, the effect of mixing on the melting temperature was studied by DSC (differential scanning calorimetry). The melting temperatures of the protective layer materials to be mixed were, 7° C., and 22° C., respectively. The Figure shows DSC graphs obtained with different mixing ratios (1-decyl alcohol and 1-dodecyl alcohol).

FIG. 7 shows melting temperatures vs. parts by weight of a protective layer material melting at 7° C. As may be seen from the Figure, the melting temperature may be adjusted by altering the mixing ratio of the materials. It may thus be concluded that the sensitivity of the indicator may be significantly improved by a temperature-sensitive protective layer. On the other hand it was shown that the indication temperature may be adjusted.

FIG. 8 shows the increase of the relative resistance of an indicator for a deep-frozen product vs. time at −6° C., and in case the product/deep-frozen product is thawed for a moment. This indicator indicates changes of the storage temperature around 0° C., the indication precision being a few degrees. The Figure shows the results for an indicator comprising, in addition to conductive polymer, protective and chemical dedoping layers, a temperature sensitive protective layer for improving the sensitivity of the indicator. The Figure shows the relative resistance vs. time for a protective layer structure. A sample constantly at −6° C. will not age significantly, whereas the resistance starts to increase if the sample is warmed to +2° C. With said structure, also the quality of the product/deep-frozen product may be measured since the increase of the resistance is significantly slower with the temperature being relowered to −6° C.

The electrical and/or optical temperature detector/indicator of the invention may be manufactured on a substrate selected from the group consisting of paper, cardboard, paperboard, plastic materials for food products, or metals, paper, cardboard, and paperboard being preferable. It may be produced by printing or coating processes, for instance using processing technologies suitable for packaging machines, such as gravure printing, spray coating, inkjet, blade coating, offset, flexo, spincoating, silk screen printing, or lamination processes. The entire surface of the packaging material may also be coated by said electrical and/or optical temperature detector/indicator, and if necessary, self-adhesive labels may be manufactured therefrom for attaching on the package. Each layer may also be printed on its respective substrate followed by adhesion thereof with each other e.g. for producing self-adhesive labels. An adhesive layer may optionally be printed between the layers. Also, the conductive polymer layer and the dedoping/doping layers may be printed on their respective foils that will subsequently be adhered to each other.

Said electrical and/or optical temperature detector/indicator may optionally be coated with a protective varnish layer or protective foil preferably comprising polyester, polyethylene, polypropylene, or polysulphone, and further, electrodes or similar elements for example using silver paste, may be printed on the detector/indicator for possible resistance measurements.

The colour change of said electrical and/or optical temperature detector/indicator may be observed and determined either visually by comparing to a reference sample, or by an optical colour reader, moreover, a change in electrical conductivity may be measured electrically using a contact device by bringing an electrode close to the temperature detector/indicator, or further, using a non-contacting method wherein capacitance is measured, or the temperature detector/indicator is incorporated as a part into a Rf tag or $Rf_{ID}$ by covering it with said temperature detector/indicator and frequency characteristics are measured, and/or the temperature detector/indicator is otherwise present as a part in a Rf tag or $Rf_{ID}$, and/or it otherwise detectably influence the operation of Rf tag or $Rf_{ID}$.

Advantages of the electrical and/or optical temperature detector/indicator according to the present invention include adjustable electrical conductivity and temperature range as well as convenient and low-cost processability making it also suitable for packages of everyday low-price consumer goods. The electrical and/or optical temperature detector/indicator according to the present invention is very suitable for controlling the cold chain of products since it indicates the temperatures, to which a product has been exposed. Product packages wherein the electrical and/or optical temperature detector/indicator according to the present invention has been incorporated, are able to transmit electronically a message corresponding to the state of the product by means of readers that may be incorporated in refrigerators, microwave ovens, or associated with other electrical appliances, for instance in households and stores, thus allowing the operation of said appliances to be controlled. Said electrical and/or optical temperature detector/indicator for instance tells the household appliances whether the temperature limit was reached in a refrigerator or microwave oven.

The invention claimed is:

1. Electrical and/or optical temperature detector/indicator, wherein the electrical and/or optical temperature detector/indicator comprises a conductive polymer layer incorporated into or onto a substrate material and at least one dedoping or doping layer, wherein the conductive polymer layer and the at least one dedoping or doping layer are separated by a temperature-sensitive protective layer comprising 1-dodecylalcohol, 1-tetradecylalcohol, 1-decylalcohol or mixtures thereof, and wherein the dedoping/doping layer comprises a support polymer.

2. Electrical and/or optical temperature detector/indicator according to claim 1, wherein the conductive polymer layer and the at least one dedoping or doping layer are superimposed, or they are present as parallel stripes, dots or geometrical patterns.

3. Electrical and/or optical temperature detector/indicator according to claim 1, wherein the conductive polymer layer and the at least one dedoping or doping layer are separated from each other by one or more protective layer(s), the protective layer having a thickness from 0 to 2 mm.

4. Electrical and/or optical temperature detector/indicator according to claim 1, wherein the conductive polymer layer comprises polyaniline, polythiophene, polypyrrole, or a polyelectrolyte.

5. Electrical and/or optical temperature detector/indicator according to claim 1, wherein the at least one dedoping or doping layer is a dedoping layer that comprises a dedoping compound selected from a group consisting of inorganic and organic bases.

6. Electrical and/or optical temperature detector/indicator according to claim 5, wherein the dedoping compound is an aromatic or aliphatic amine, pyridine, urea derivative, alkali-metal, alkaline earth metal, or metal hydroxide or carbonate, octadecyl amine, hexadecyl amine, or hexamethyl tetraamine.

7. Electrical and/or optical temperature detector/indicator according to claim 1, wherein the at least one dedoping or doping layer is a doping layer that comprises a doping compound selected from a group consisting of organic and inorganic acids.

8. Electrical and/or optical temperature detector/indicator according to claim 7, wherein the doping compound is selected from the group consisting of sulphonic acid, sulphuric acid, phosphoric acid, boric acid, nitric acid, nitrous acid, HCl, HI, HF, HBr, $HClO_4$, $HClO_3$, $H_2CO_3$, acetic acid, formic acid, benzoic acid, succinic acid, maleic acid, tartaric acid, citric acid, fumaric acid, and malic acid.

9. Electrical and/or optical temperature detector/indicator according to claim 1, wherein the substrate is selected from a group consisting of paper, cardboard, paperboard, plastic material, and metal.

10. Electrical and/or optical temperature detector/indicator according to claim 1, wherein the temperature detection/indication is achieved electrically by observing changes in the electrical conductivity of the conductive polymer, and/or optically by observing color change.

11. Electrical and/or optical temperature detector/indicator according to claim 10, wherein the color change is determined by visually comparing the color change to a reference sample, or using an optical color reader.

12. Electrical and/or optical temperature detector/indicator according to claim 10, wherein the change in electrical conductivity is measured electrically by bringing an electrode of a contacting device close to the temperature detector/indicator or by means of a non-contacting method measuring capacitance.

13. Electrical and/or optical temperature detector/indicator according to claim 10, wherein the change in electrical conductivity is measured using frequency characteristics obtained by incorporating the temperature detector/indicator as into a Rf tag or a $Rf_{ID}$ by covering the Rf tag or the $Rf_{ID}$ with the temperature detector/indicator.

14. Electrical and/or optical temperature detector/indicator according to claim 13, wherein the temperature detector/indicator is present as a part in the Rf tag or the $Rf_{ID}$, and/or detectably influences the operation of the Rf tag or the $Rf_{ID}$.

15. Electrical and/or optical temperature detector/indicator according to claim 1, wherein the support polymer is selected from a group consisting of polypropylene, polyethylene, polystyrene, polymethylmethacrylate, polyvinylphenol, polystyrene-polybutadiene latexes, and polystyrene-polyethylene butylene block copolymers.

16. A method for producing an electrical and/or optical temperature detector/indicator according to claim 1, wherein the detector/indicator is manufactured on a substrate by printing and/or coating methods.

17. The method of claim 16, wherein the substrate is selected from the group consisting of paper, cardboard, paperboard, a plastic material, and metal.

18. The method of claim 16, wherein the printing and/or coating methods are selected from the group consisting of gravure printing, spray coating, inkjet, blade coating, offset, flexography, spin coating, silk screen printing, and lamination processes.

19. A method comprising monitoring storage temperatures of product packages by using the electrical and/or optical temperature detector/indicator according to claim 1.

* * * * *